(12) United States Patent
Morris et al.

(10) Patent No.: US 8,755,425 B2
(45) Date of Patent: Jun. 17, 2014

(54) METHOD AND SYSTEM FOR TRANSMISSION OF IDENTIFICATION VIA METADATA FOR REPEATING RELAYS USING SPREAD-SPECTRUM TECHNOLOGY

(75) Inventors: Frederick Morris, Gathersburg, MD (US); Michael Beeler, Jefferson, MD (US)

(73) Assignee: Comtech EF Data Corp., Tempe, AZ (US)

( * ) Notice: Subject to any disclaimer, the term of this patent is extended or adjusted under 35 U.S.C. 154(b) by 567 days.

(21) Appl. No.: 13/024,951

(22) Filed: Feb. 10, 2011

(65) Prior Publication Data

US 2012/0002701 A1 Jan. 5, 2012

Related U.S. Application Data

(63) Continuation-in-part of application No. 13/024,402, filed on Feb. 10, 2011.

(60) Provisional application No. 61/360,213, filed on Jun. 30, 2010.

(51) Int. Cl.
 *H04B 1/707* (2011.01)

(52) U.S. Cl.
 USPC ............ 375/141; 370/325; 342/357; 382/100

(58) Field of Classification Search
 CPC ........................... H04B 7/18515; H04B 1/707
 USPC ............................ 375/141; 370/325; 342/357
 See application file for complete search history.

(56) References Cited

U.S. PATENT DOCUMENTS

| 4,455,651 | A | * | 6/1984 | Baran ........................... 370/320 |
| 4,744,083 | A | * | 5/1988 | O'Neill et al. ................. 714/704 |
| RE32,905 | E | * | 4/1989 | Baran ........................... 370/320 |
| 4,901,307 | A | * | 2/1990 | Gilhousen et al. ............. 370/320 |
| 5,048,015 | A | * | 9/1991 | Zilberfarb ...................... 370/312 |
| 5,245,612 | A | * | 9/1993 | Kachi et al. ................... 370/324 |
| 5,420,883 | A | * | 5/1995 | Swensen et al. ............... 375/138 |
| 5,537,397 | A |   | 7/1996 | Abramson |
| 5,666,648 | A | * | 9/1997 | Stuart ........................... 370/321 |
| 6,020,845 | A | * | 2/2000 | Weinberg et al. ............. 342/354 |
| 6,408,178 | B1 | * | 6/2002 | Wickstrom et al. ........... 455/427 |
| 6,985,512 | B1 |   | 1/2006 | McDermott et al. |
| 7,227,884 | B2 |   | 6/2007 | McDermott |
| 7,433,391 | B2 |   | 10/2008 | Stafford et al. |
| 7,596,170 | B2 |   | 9/2009 | McDermott et al. |
| 8,054,865 | B1 | * | 11/2011 | Frost ............................. 375/140 |
| 2002/0072855 | A1 | * | 6/2002 | Fuchs et al. ................... 701/213 |
| 2003/0181161 | A1 | * | 9/2003 | Harles et al. ................. 455/12.1 |
| 2004/0259497 | A1 | * | 12/2004 | Dent ............................ 455/13.3 |

(Continued)

*Primary Examiner* — Daniel Washburn
*Assistant Examiner* — Berhanu Tadese
(74) *Attorney, Agent, or Firm* — Booth Udall Fuller, PLC

(57) ABSTRACT

A communication method for transmitting meta-data through a meta-carrier signal comprising encoding meta-data using an encoder, the meta-data comprising information that identifies a repeating relay to which a spread meta-carrier signal is to be transmitted, encoded using an encoder, modulating, using a modulator and spreading, using a spreader, the encoded meta-data such that the spread meta-carrier signal results, and transmitting, by a transmitting device, the spread meta-carrier signal to the repeating relay wherein the repeating relay does not process or modify the spread meta-carrier signal, the spread meta-carrier signal being transmitted over at least a portion of a bandwidth of the repeating relay.

56 Claims, 10 Drawing Sheets

(56) References Cited

U.S. PATENT DOCUMENTS

| | | | |
|---|---|---|---|
| 2006/0176843 A1* | 8/2006 | Gat et al. | 370/316 |
| 2007/0116325 A1* | 5/2007 | Rhoads et al. | 382/100 |
| 2008/0080737 A1* | 4/2008 | Rhoads et al. | 382/100 |
| 2009/0190634 A1* | 7/2009 | Bauch et al. | 375/211 |
| 2009/0323640 A1* | 12/2009 | Chakrabarti et al. | 370/335 |
| 2010/0002582 A1* | 1/2010 | Luft et al. | 370/230.1 |

* cited by examiner

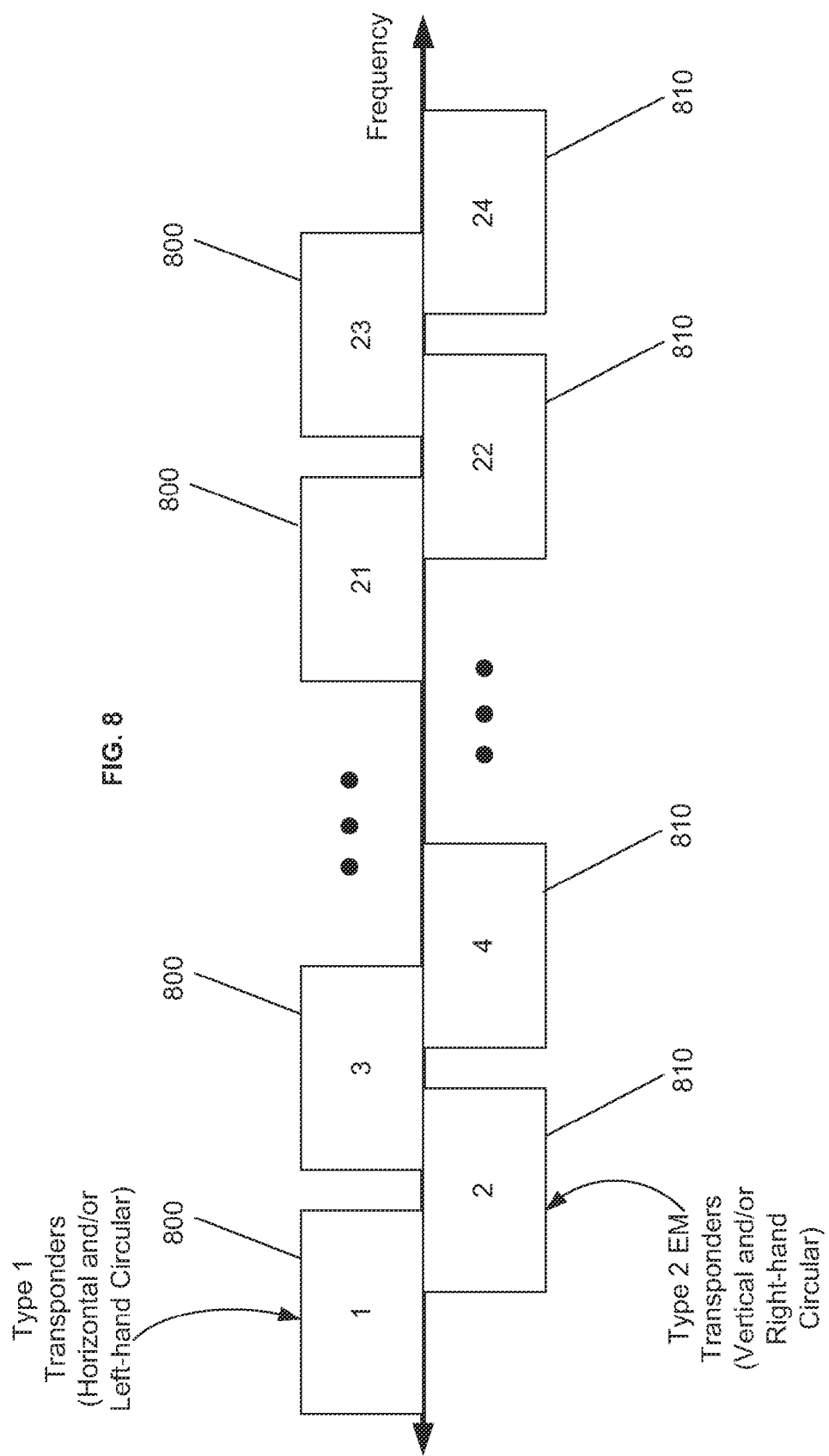

METHOD AND SYSTEM FOR TRANSMISSION OF IDENTIFICATION VIA METADATA FOR REPEATING RELAYS USING SPREAD-SPECTRUM TECHNOLOGY

CROSS REFERENCE TO RELATED APPLICATIONS

This document claims the benefit of the filing date of U.S. Provisional Patent Application No. 61/360,213, entitled "A Method for Transmission of Identification via Meta-data for Repeating Relays Using Spread-Spectrum Technology" to Frederick Morris, et al., which was filed on Jun. 30, 2010, and is a Continuation In Part of U.S. Application No. 13/024,402 entitled "Embedded Meta-Carrier with Spread Spectrum via Overlaid Carriers" to Michael Beeler, et al., which was filed on Feb. 10, 2011, the disclosures of which are hereby incorporated entirely by reference herein.

BACKGROUND

1. Technical Field

Aspects of this document relate generally to telecommunication systems and techniques for transmitting data across a telecommunication channel.

2. Background Art

Since the advent of satellite communications, a recurring problem that continues to challenge the industry are Radio Frequency (RF) carriers transmitting on satellites and frequencies in transponders to which they are not assigned. As more satellites enter service and the geostationary arc fills, the problem becomes more acute as two degree spacing of the satellites becomes the norm. Improper operation and transmission of carriers is primarily due to human error and can result in service disruptions due to interference with the correctly assigned carriers.

Currently, the majority of satellites do have beacons for alignment, however, these beacons typically comprise an unmodulated carrier that provides no information about the repeating relay other than its center frequency.

SUMMARY

Implementations of a communication method for transmitting meta-data through a meta-carrier signal may comprise encoding meta-data using an encoder, the meta-data comprising information that identifies a repeating relay to which a spread meta-carrier signal is to be transmitted, modulating, using a modulator, the encoded meta-data signal, spreading, using a spreader, the modulated meta-carrier such that the spread meta-carrier signal results, and transmitting, by a transmitting device, the spread meta-carrier signal to the repeating relay wherein the repeating relay does not process or modify the spread meta-carrier signal, the spread meta-carrier signal being transmitted over at least a portion of the bandwidth of the repeating relay.

Particular implementations may comprise one or more of the following features. Methods may further comprise receiving the spread meta-carrier signal by a receiving device, despreading, using a despreader, the spread meta-carrier signal, demodulating, using a demodulator, the de-spread meta-carrier signal, and decoding, using a decoder, the demodulated meta-carrier signal. The spread meta-carrier signal may be transmitted over substantially the entire bandwidth of the repeating relay. The repeating relay may be located on a satellite. The modulating may use a phase shift keying (PSK) technique. The spreading may use a predetermined pseudo-random-noise (PRN) sequence. The meta-data may further comprise ephemeris data for the repeating relay. The meta-data may further comprise information that identifies or describes the repeating relay or one or more transponders to which the spread meta-carrier signal is to be transmitted.

Implementations of a communication method for transmitting meta-data through a meta-carrier signal may comprise encoding meta-data using an encoder, the meta-data comprising information that identifies a repeating relay to which a spread meta-carrier signal is to be transmitted, modulating, using a modulator, the encoded meta-data signal, spreading, using a spreader, the modulated meta-carrier such that the spread meta-carrier signal results, and transmitting, by a transmitting device, the spread meta-carrier signal to the repeating relay wherein the repeating relay reroutes the spread meta-carrier signal to one or more transponders, the spread meta-carrier signal being transmitted over at least a portion of a bandwidth of the repeating relay.

Particular implementations may comprise one or more of the following features. The methods may further comprise receiving the spread meta-carrier signal by a receiving device, despreading, using a despreader, the spread meta-carrier signal, demodulating, using a demodulator, the de-spread meta-carrier signal, and decoding, using a decoder, the demodulated meta-carrier signal. The spread meta-carrier signal may be transmitted over substantially the entire bandwidth of the repeating relay. The repeating relay may be located on a satellite. The methods may further comprise extracting, by a beacon extraction device within the repeating relay, the spread meta-carrier signal, routing, by the beacon extraction device, the spread meta-carrier signal to a beacon injection device, and embedding, by the beacon injection device, the spread meta-carrier signal to one or more transponders. The methods may further comprise routing, by the beacon extraction device, the meta-carrier signal to a beacon processor, and processing, by the beacon processor, the meta-carrier signal to form a processed meta-carrier signal. The methods may further comprise storing, by a storage device, meta-data received by the repeating relay. The modulating may use a phase shift keying (PSK) technique. The spreading may use a predetermined pseudo-random-noise (PRN) sequence. The meta-data may further comprise ephemeris data for the repeating relay. The meta-data may further comprise information that identifies one or more transponders to which the spread meta-carrier signal is to be transmitted. The processing may create a unique meta-carrier signal for each transponder. The processing may create a substantially identical meta-carrier signal for each transponder. The methods may further comprise retaining, by the beacon processor, the processed meta-carrier signal, and loading, by the beacon processor, the processed meta-carrier signal when the repeating relay is created.

Implementations of a communication method for transmitting meta-data through a meta-carrier signal may comprise spreading, by a spreading device, a meta-carrier signal containing data stored by a repeating relay and meta-data comprising information that identifies the repeating relay, and transmitting the spread meta-carrier signal to a remote receiver, the spread meta-carrier signal being transmitted over at least a portion of a bandwidth of the repeating relay.

Particular implementations may comprise one or more of the following features. The spread meta-carrier signal may be transmitted over substantially the entire bandwidth of the repeating relay. The repeating relay may be located on a satellite. The spreading may use a predetermined pseudo-random-noise (PRN) sequence. The meta-data may further comprise ephemeris data for the repeating relay. The metadata may further comprise information that identifies or describes the repeating relay or one or more transponders to which a carrier signal is to be transmitted.

Implementations of a communication system for transmitting meta-data through a meta-carrier signal may comprise an encoder that encodes meta-data, the meta-data comprising information that identifies a repeating relay to which a spread meta-carrier signal is to be transmitted, a modulator that modulates the encoded meta-data signal, a spreader that spreads the modulated meta-carrier such that the spread meta-carrier signal results, and a transmitting device that transmits the spread meta-carrier signal to the repeating relay wherein the repeating relay does not process or modify the spread meta-carrier signal, the spread meta-carrier signal being transmitted over at least a portion of a bandwidth of the repeating relay.

Particular implementations may comprise one or more of the following features. The system may further comprise a receiving device that receives the spread meta-carrier signal, a despreader that despreads the spread meta-carrier signal, a demodulator that demodulates the de-spread meta-carrier signal, and a decoder that decodes the demodulated meta-carrier signal. The spread meta-carrier signal may be transmitted over substantially the entire bandwidth of the repeating relay. The repeating relay may be located on a satellite. The modulator may use a phase shift keying (PSK) technique. The spreader may use a predetermined pseudo-random-noise (PRN) sequence. The meta-data may further comprise ephemeris data for the repeating relay. The meta-data may further comprises information that identifies a modulator that modulates the spread meta-carrier signal, and one or more transponders to which the spread meta-carrier signal is to be transmitted.

Implementations of a communication system for transmitting meta-data through a meta-carrier signal may comprise an encoder that encodes meta-data, the meta-data comprising information that identifies a repeating relay to which a spread meta-carrier signal is to be transmitted, a modulator that modulates the encoded meta-data signal using a modulator, a spreader that spreads the modulated meta-carrier such that the spread meta-carrier signal results, and a transmitting device that transmits, the spread meta-carrier signal to the repeating relay wherein the repeating relay reroutes the spread meta-carrier signal to one or more transponders, the spread meta-carrier signal being transmitted over at least a portion of a bandwidth of the repeating relay.

Particular implementations may comprise one or more of the following features. The system may further comprise a receiving device that receives the spread meta-carrier signal, a despreader that despreads the spread meta-carrier signal, a demodulator that demodulates the de-spread meta-carrier signal, and a decoder that decodes the demodulated meta-carrier signal. The spread meta-carrier signal may be transmitted over substantially the entire bandwidth of the repeating relay. The repeating relay may be located on a satellite. The system may further comprise a beacon extraction device within the repeating relay that extracts the spread meta-carrier signal and routes the spread meta-carrier signal to a beacon injection device that embeds the spread meta-carrier signal to one or more transponders. The system may further comprise a beacon processor that receives the meta-carrier signal from the beacon extraction device and processes the meta-carrier signal to form a processed meta-carrier signal. The system may further comprise a storage device that stores meta-data received by the repeating relay. The modulator may use a phase shift keying (PSK) technique. The spreader may use a predetermined pseudo-random-noise (PRN) sequence. The meta-data may further comprise ephemeris data for the repeating relay. The meta-data may further comprise information that identifies one or more transponders to which the spread meta-carrier signal is to be transmitted. The processor may create a unique meta-carrier signal for each transponder. The processor may create a substantially identical meta-carrier signal for each transponder. The beacon processor may retain the processed meta-carrier signal and loads the processed meta-carrier signal when the repeating relay is created.

Implementations of a communication system for transmitting meta-data through a meta-carrier signal may comprise a spreader that spreads a meta-carrier signal containing data stored by a repeating relay and meta-data comprising information that identifies the repeating relay, and a transmitting device that transmits the spread meta-carrier signal to a remote receiver, the spread meta-carrier signal being transmitted over at least a portion of a bandwidth of the repeating relay.

Particular implementations may comprise one or more of the following features. The spread meta-carrier signal may be transmitted over substantially the entire bandwidth of the repeating relay. The repeating relay may be located on a satellite. The spreader may use a predetermined pseudo-random-noise (PRN) sequence. The meta-data may further comprise ephemeris data for the repeating relay. The meta-data may further comprise information that identifies one or more transponders to which a carrier signal is to be transmitted. The meta-data may be stored in a memory device that is programmed before the repeating relay is placed into service. The meta-data may be transmitted to the repeating relay using a method of electromagnetic or optical transmission.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. §112, ¶ 6. Thus, the use of the words "function," "means" or "step" in the Description, Drawings, or Claims is not intended to somehow indicate a desire to invoke the special provisions of 35 U.S.C. §112, ¶ 6, to define the invention. To the contrary, if the provisions of 35 U.S.C. §112, ¶ 6 are sought to be invoked to define the claimed disclosure, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. §112, ¶ 6. Moreover, even if the provisions of 35 U.S.C. §112, ¶ 6 are invoked to define the claimed disclosure, it is intended that the disclosure not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and:

FIG. 8 is a diagram of an implementation of a relay having a plurality of EM transponders.

DESCRIPTION

This disclosure, its aspects and implementations, are not limited to the specific components, frequency examples, or methods disclosed herein. Many additional components and assembly procedures known in the art consistent with the transmission of identification via meta-data are in use with particular implementations from this disclosure. Accordingly, although particular implementations are disclosed, such implementations and implementing components may comprise any components, models, versions, quantities, and/or the like as is known in the art for such systems and implementing components, consistent with the intended operation.

This disclosure relates to, but is not limited to, a method and system for providing information in the form of meta-data that uses spread spectrum technology to create a meta-carrier used to create a smart beacon for a repeating relay device. Particular implementations described herein are and may use, but are not limited to, Field-Programmable Gate Arrays (FPGA), digital signal processors, Application-Specific Integrated Circuits (ASIC), Programmable Integrated Circuits (PIC), or microprocessors.

This disclosure further describes systems and methods for providing information in the form of meta-data that is embedded as a low-energy density meta-carrier into a repeating relay device for use by terrestrial, airborne and space-based operation. The smart beacon may utilize techniques known in the art for digital, analog and radio frequency design methodologies to enhance existing and future relay devices for use in identifying the relay.

Aspects of this disclosure relate to methods and systems for creating a low-energy density meta-carrier for use as a smart beacon using spread spectrum spreading, modulation, transmission, reception, demodulation, despreading, decoding and processing of the meta-data that comprises the smart beacon.

This disclosure relates to a method of embedding information regarding an electromagnetic transmission's origin. A need exists for a method of identifying satellite transponders to reduce uncertainty of carrier assignment. Therefore, a method of embedding information about the repeating relay within the repeating relay platform comprising a relay, transponder, or satellite is needed. Information about the repeating relay may be carried in the form of meta-data information and may contain, but is not limited to, ephemeris data, the name of the repeating relay, name of the owner, orbital location, center frequency, passband, and transponder electromagnetic (EM) polarization, etc. This meta-data eliminates ambiguity with regard to the satellite and transponder of operation. The methods and systems described herein allow a person of only moderate skill, for example, a person with only months of experience on earth station alignment techniques, to reliably align to the correct satellite and transponder assignment.

Figure 1:
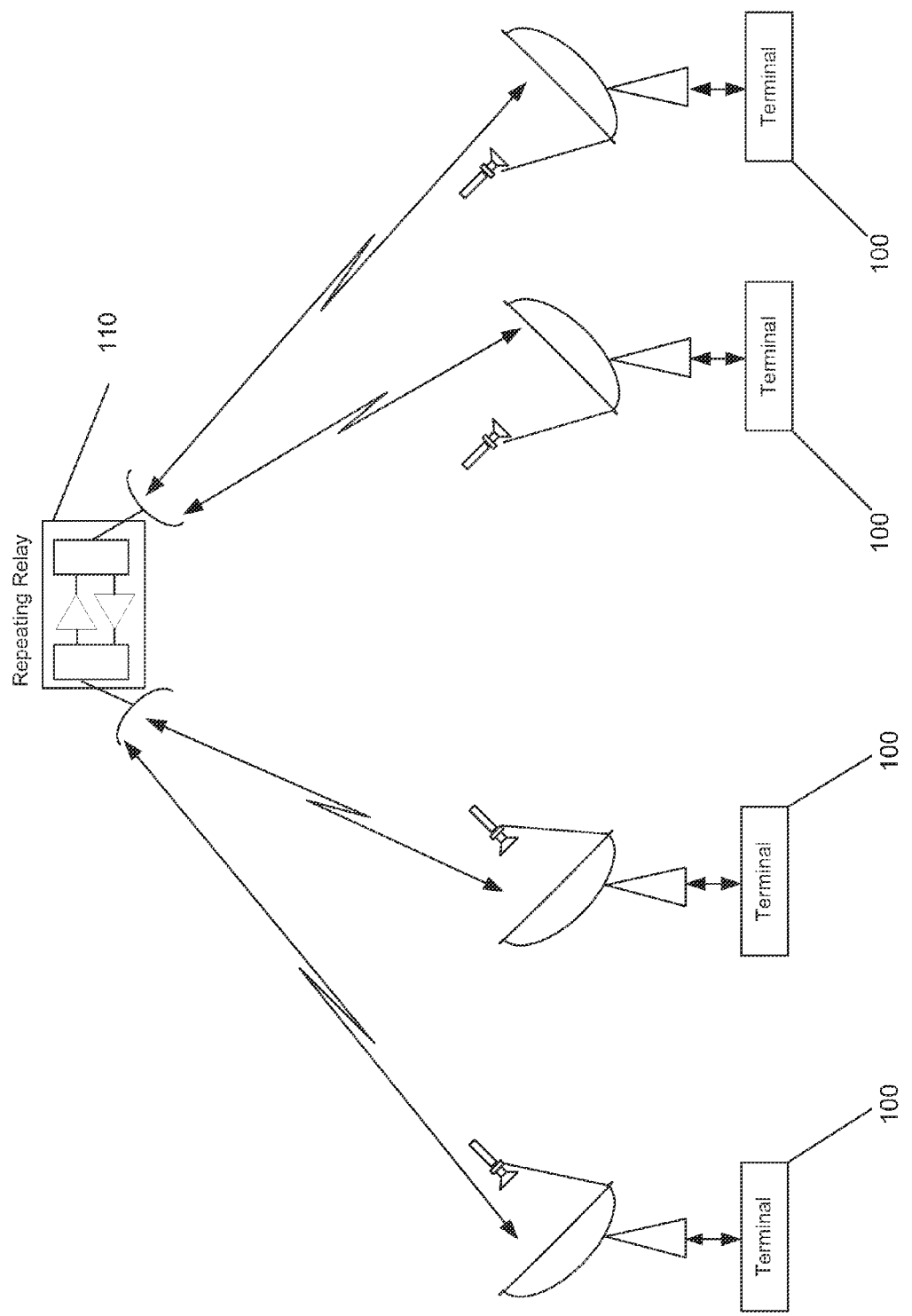
FIG. 1 depicts an implementation of a transmission network using a space-based satellite relay.

Various implementations of this disclosure are intended to be employed for an EM emitting device, such as optical or Radio Frequency (RF) transmission equipment for point-to-point, point-to-multipoint and/or multipoint-to-multipoint for embedded information, an example of which is shown in FIG. 1.

Methods for providing transmission information via meta-data may be accomplished by spreading a very low-data rate carrier (containing information about the desired carrier known as the "meta-data") over a portion or the entire passband of the repeating relay's transponder or transponders. The low-data rate carrier may be spread, or as it is known in the art, "chipped," with a direct sequence spread spectrum (DSSS) pseudo-random number (PRN) sequence to create a low energy meta-carrier that may be placed over a portion or entire passband of the repeating relay. This process of spreading the very low-data rate carrier and placing it over a portion of or the entire passband is shown in FIGS. 2A-D.

One novel aspect of the disclosed methods and systems may involve using a large spreading factor that results in spreading the meta-carrier's energy over a significantly large bandwidth, of many orders of magnitude, many times the original meta-data's rate. The dispersion of energy may result in a miniscule amount of noise being added to the transponder's spectrum. Additionally, the act of spreading the meta-carrier information by many orders of magnitude (hundreds, thousands or even millions of times) may result in tremendous processing gain that can be realized to extract and separate the meta-carrier's meta-data from the received transponder even when the transponder is used for transmission of information carriers. The meta-carrier may be placed on a single transponder or a plurality of transponders, if available, and the meta-data may be extracted by a receiving device from the embedded meta-carrier contained in the passband of the transponder. The spread spectrum meta-carrier may be placed over a portion or the entire passband of the transponder.

Additionally, another novel aspect of one or more of the disclosed methods and systems may involve the embedded meta-carrier being used as a smart beacon to identify the repeating relay. The large processing gain, as a result of spreading the meta-data's meta-carrier over a portion or the entire passband of the relay's transponder or transponders, may be utilized to separate the meta-carrier energy from the information carriers being supported by the transponders at the receiving device. The smart beacon may be utilized on a single transponder of a chosen EM configuration, two orthogonal/opposite EM configurations (horizontal verses vertical or clockwise verses counter-clockwise), and/or any combination of partial or all transponders of EM configurations, and may contain similar or different meta-data for each transponder.

Particular implementations of insertion of transmission of meta-data information over a low-energy density meta-carrier for use as a smart beacon are disclosed herein and may be specifically employed in satellite communications systems. However, as will be clear to those of ordinary skill in the art from this disclosure, the principles and aspects disclosed herein may readily be applied to any electromagnetic (IF, RF and optical) communications system, such as terrestrial or airborne broadcast networks without undue experimentation.

FIG. 1 depicts a satellite-based repeating relay being utilized by many devices that may both transmit and receive to/from the repeating relay. More specifically, FIG. 1 illustrates a particular implementation of a satellite transmission system comprised of earth stations 100 such as the one shown in FIG. 6, communicating over a repeating relay 110 such as those shown in FIGS. 3-5. The earth stations 100 and the repeating relay 110 may be separated by tens, hundreds or thousands of miles. In particular embodiments, the remote relay may operate over one or more of L-Band, S-Band, C-Band, X-Band, Ku-Band and/or Ka-Band, or any other suitable communication band.

A repeating relay 110 may comprise a single input frequency that may be frequency up and/or down-converted and/or power amplified and re-transmitted. In the simplest configuration, the input to output of the relay 110 comprises the simplest form of a transponder. The "bandwidth" of a relay is known in the art as the "passband." The passband of a relay is the range between the lowest and highest frequency that may be passed through the repeating relay's transponder.

As shown in FIGS. 2A-D, using the attributes of spread spectrum technology, a low-data rate data stream may be spread using DSSS spreading with a PRN sequence resulting in a low-energy density carrier that may be placed over a portion or entire passband of a transponder or transponders of a repeating relay. FIGS. 2A-D illustrate the concept of the passband shown in the dashed lines with a center frequency as fc. The passband includes the lowest frequency (shown to the left side of fc) to the highest frequency (shown to the right side of fc), such that all frequencies between the two extremes are known as the passband. In the art, the passband may be defined as the point where the half power or by non-limiting example, 3 Decibel (3 dB) of power is cut off (or known as roll off). The operation of particular embodiments of the disclosed methods may use a portion or the entire bandwidth in the 3 dB passband of the transponder. One of ordinary skill in the art will recognize that this disclosure is not limited to a 3 dB passband and as such, any appropriate passband may be used. A transponder may be utilized for the reception of user data in the form of a modulated carrier by modulation techniques know in the art, but not limited to, Amplitude Modulation (AM), Frequency Modulation (FM), Phase Shift Keying (PSK), Frequency Shift Keying (FSK), etc. The transponder may be configured to accept any modulated carrier or carriers that fall into the passband of the transponder and to frequency convert (up and/or down) and/or amplify the carriers and relay them from the repeating relay.

In the described methods, spread-spectrum technology, such as but not limited to direct sequence spread-spectrum (DSSS) technology may be utilized to spread low-data rate information, known as meta-data. This meta-data may contain, but is not limited to, ephemeris data, the name of the repeating relay, name of the owner, orbital location, center frequency, passband, and transponder electromagnetic (EM) polarization, etc. The meta-data may then be spread via a spread spectrum technique known in the art as chipping which may include using a predetermined PRN sequence that may result in each bit of the meta-data being spread by hundreds, thousands or even millions of times. The act of spreading the low-data rate meta-data may result in a meta-carrier that may be comprised of many hundreds, thousands or even millions of chips of each bit of information. Chipping a meta-data stream with a PRN sequence may result in a gain known in the art as "processing gain." The processing gain is the linear ratio of the chipping rate divided by the meta-data rate, and is commonly called the spread factor. The processing gain is typically known in terms of gain in decibels, and is calculated as 10*Log(Spread Factor).

As a non-limiting example, a 10-bit per second meta-data carrier may be spread over a 36 MHz transponder. The 36 MHz transponder may provide support for a 36 Mega-chip per second (36 Mcps) carrier, resulting in the spread factor of 36,000,000/10 or 3,600,000. Expressed in terms of processing gain, the processing gain due to spreading may be 10*Log (3,600,000) or 65.56 dB. The meta-carrier could be embedded into the noise floor of the transponder in a manner that has little to no impact to the user data carriers being supported by the transponder. The processing gain of 65.56 dB may allow ample separation between the user data carriers, which appear as noise to the meta-carrier, such that the meta-carrier may be extracted using a receiver such as that shown in FIG. 7.

As a second non-limiting example, a 10-bit per second meta-data carrier may be spread over a 54 MHz transponder. The 54 MHz transponder may provide support for a 54 Mega-chip per second (54 Mcps) carrier, resulting in the spread factor of 54,000,000/10 or 5,400,000. Expressed in terms of processing gain, the processing gain due to spreading may be 10*Log(5,400,000) or 67.32 dB. The meta-carrier could be embedded into the noise floor of the transponder in a manner that has little to no impact to the user data carriers being supported by the transponder. The processing gain of 67.32 dB may allow ample separation between the user data carriers, which appear as noise to the meta-carrier, such that the meta-carrier may be extracted using a receiver such as that shown in FIG. 7.

As yet another non-limiting example, a 20-bit per second meta-data carrier may be spread over a 72 MHz transponder. The 72 MHz transponder may provide support for a 72 Mega-chip per second (72 Mcps) carrier, resulting in the spread factor of 72,000,000/20 or 3,600,000. Expressed in terms of processing gain, the processing gain due to spreading may be 10*Log(3,600,000) or 65.56 dB. The meta-carrier may be embedded into the noise floor of the transponder in a manner that results in little to no impact to the user data carriers being supported by the transponder. The processing gain of 65.56 dB may allow ample separation between the user data carriers, which appear as noise to the meta-carrier, such that the meta-carrier may be extracted using a receiver such as that shown in FIG. 7.

Figure 2A:
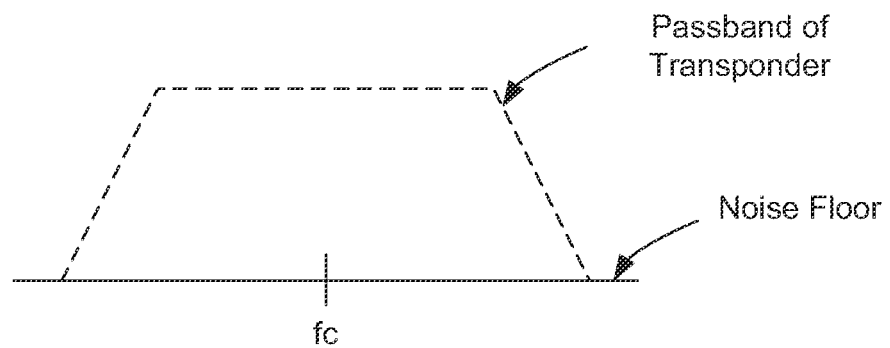
FIGS. 2A-D illustrate representations of an embedded meta-carrier waveform.
Figure 2B:
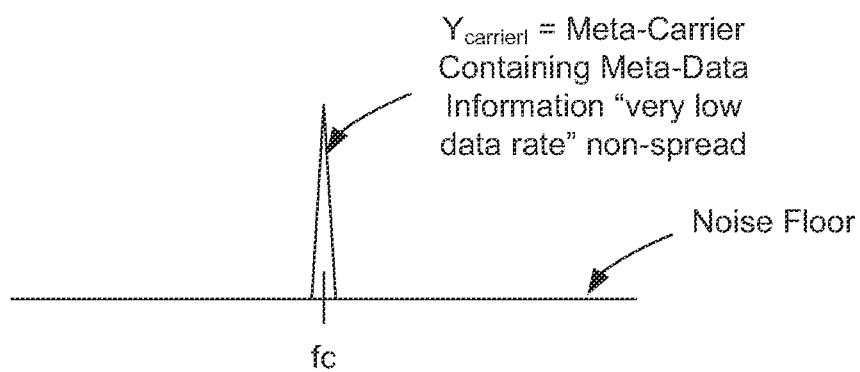
Figure 2C:
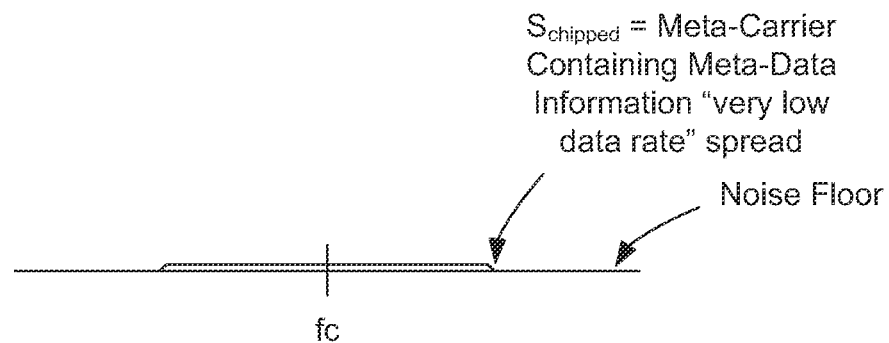
Figure 2D:
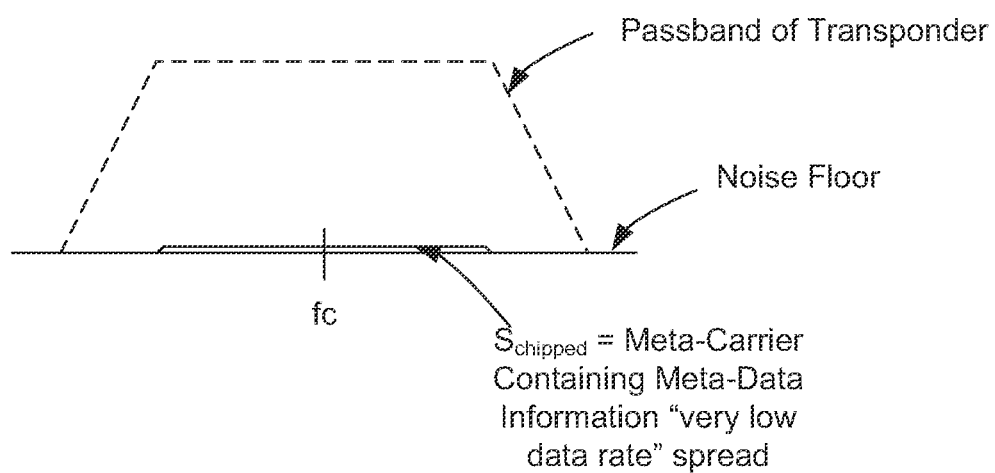
Figure 2E:
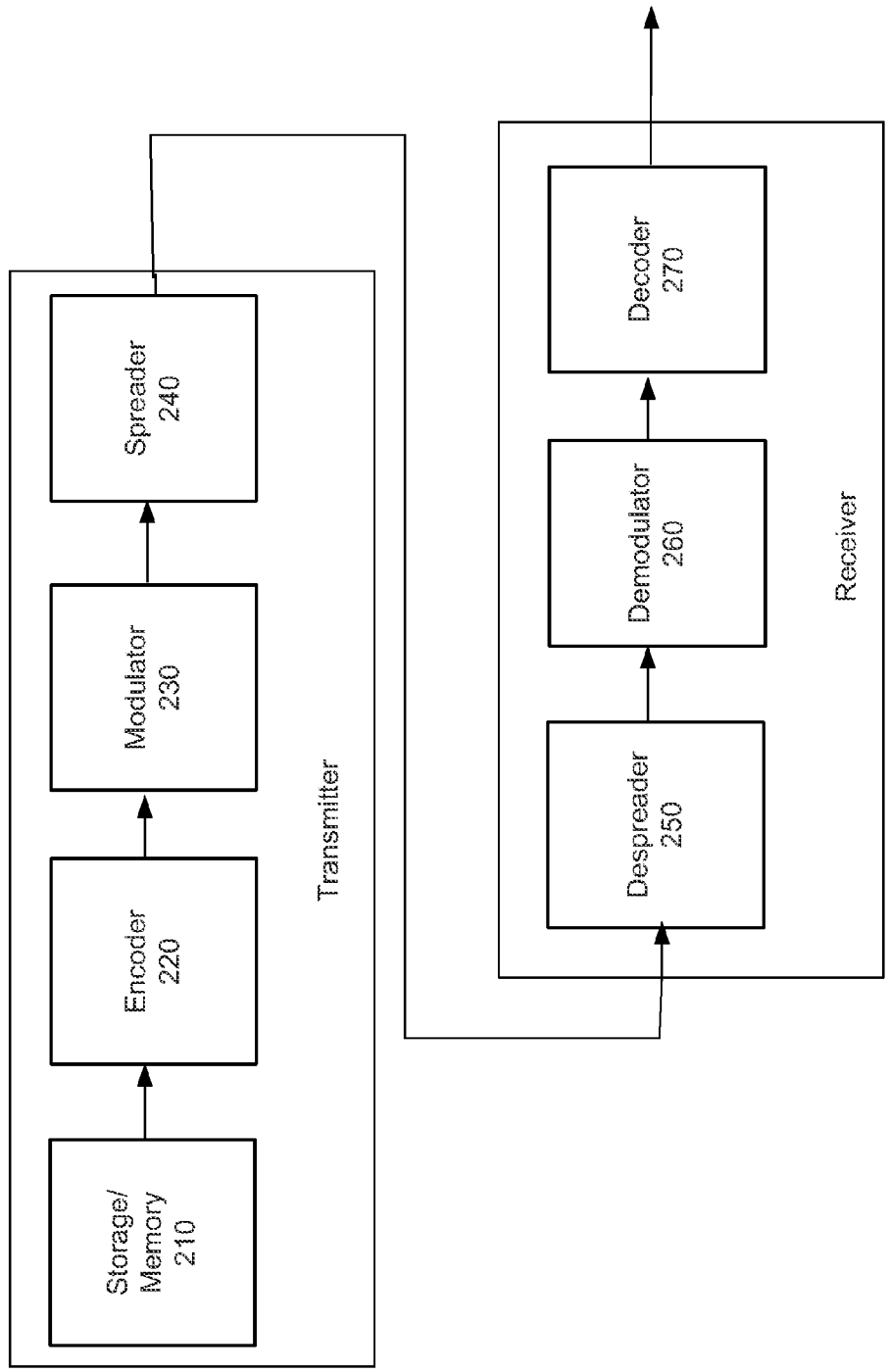
FIG. 2E is a block diagram depicting hardware components of an implementation of a system for transmitting and receiving a low-energy density meta-carrier signal.

FIG. 2E depicts exemplary hardware components of an implementation of a system that transmits and receives a low-energy density meta-carrier signal. As shown, such implementations may comprise hardware components including, but not limited to memory or storage devices 210, an encoding device 220, a modulator 230, a spreading device 240, a dispreading device 250, a demodulator 260, and a decoder 270. One of ordinary skill in the art would recognize that any such configuration or hardware components consistent with this disclosure may also be used.

Figure 3:
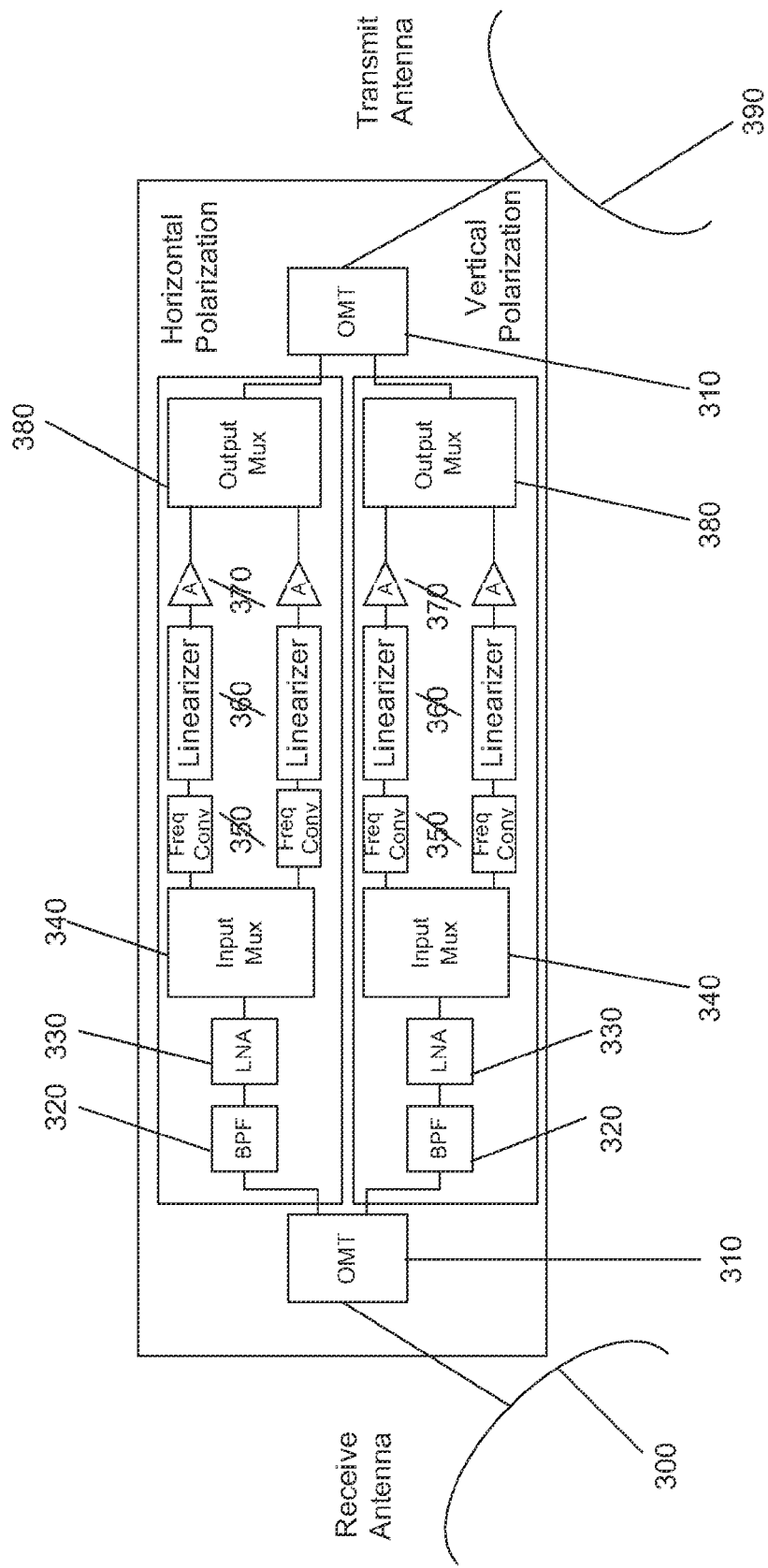
FIG. 3 is a block diagram of a prior art implementation of a relay with no provision for onboard processing of a low-energy density meta-carrier.
Figure 4:
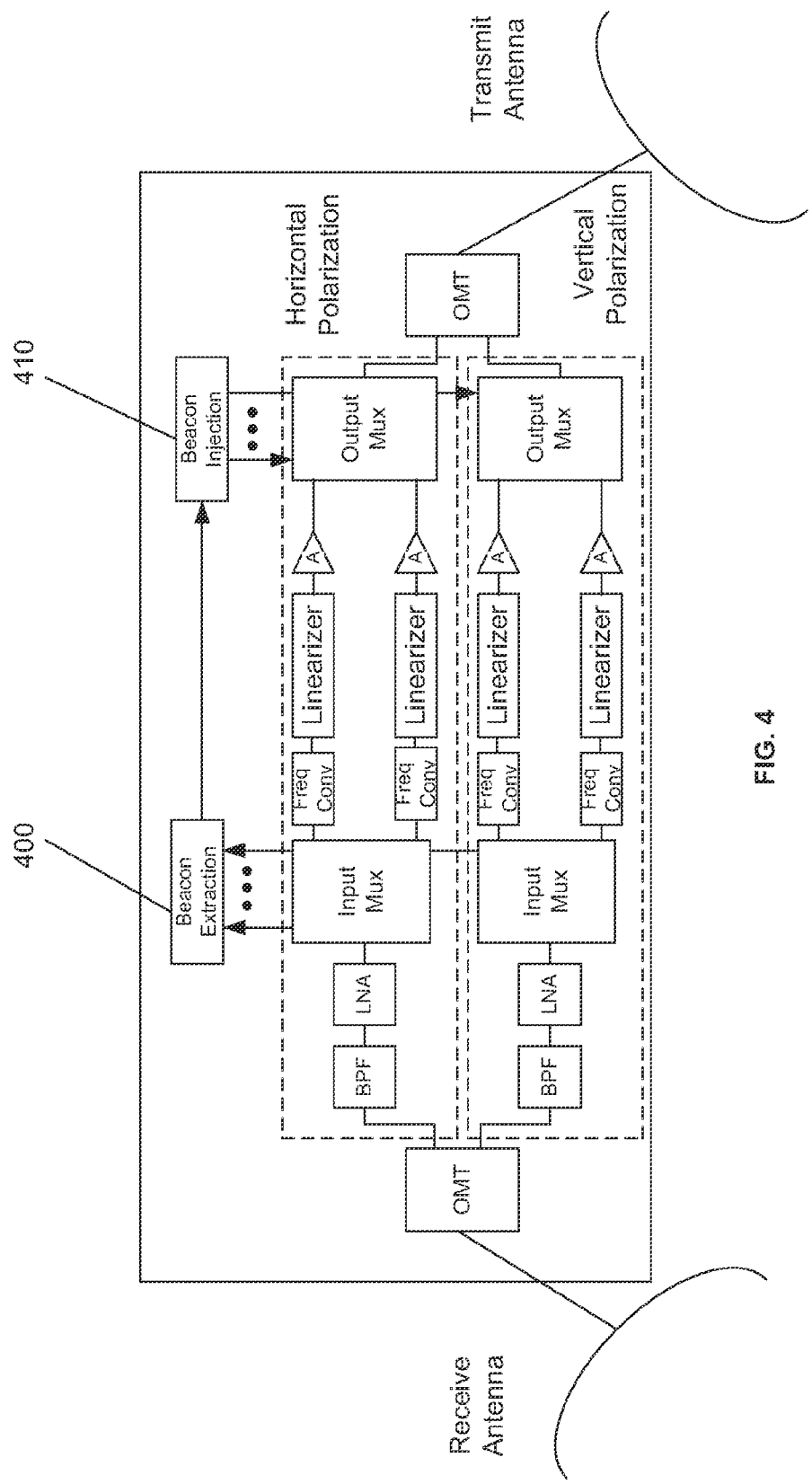
FIG. 4 is a block diagram of an implementation of a relay with provisions for routing and distribution of a low-energy density meta-carrier.
Figure 5:
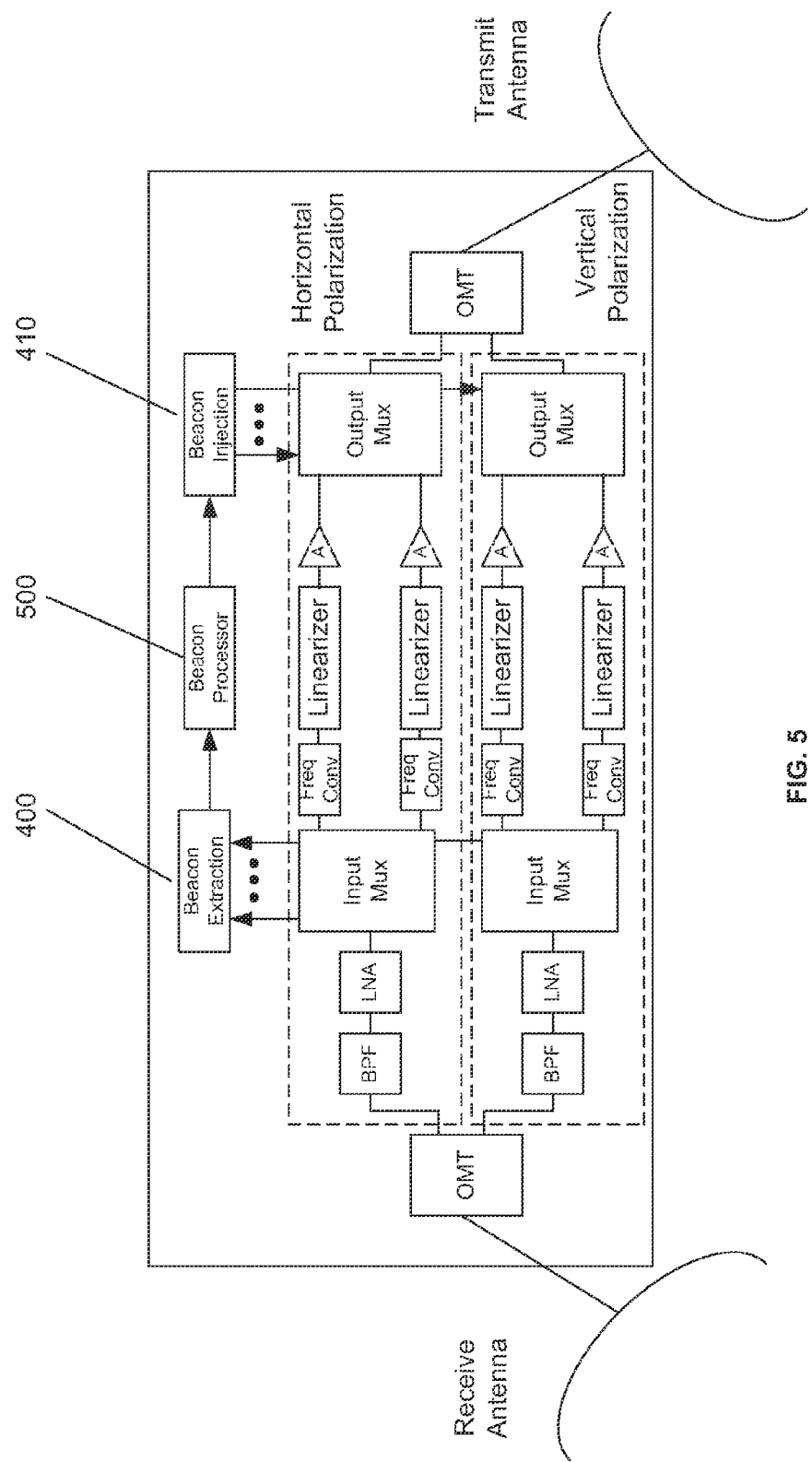
FIG. 5 is a block diagram of an implementation of a relay with provisions for storage and processing of a low-energy density meta-carrier.

FIGS. 3-5 demonstrate multiple configurations of repeating relays and show how each may be configured to provide a low-energy density meta-carrier that contains meta-data for a smart beacon using implementations of the described methods and systems.

In the simplest embodiment of the method, the spread spectrum meta-carrier may be created at a transmission station and transmitted to the remote relay as shown in FIG. 3 and embedded into one or a plurality of transponders. For each transponder to support the embedded carrier, for particular implementations of the methods described, a meta-carrier is transmitted for every transponder.

FIG. 3 demonstrates existing repeater relay technology used in the art where a meta-carrier containing meta-data may be transmitted to a relay repeater where the low-energy meta-carrier may be combined with the data carriers being supported by the repeating relay. The repeating relay of FIG. 3 has no onboard processing of the meta-carriers other than to relay from the input (receive antenna) 300, separate in the Orthogonal Mode Transducer (OMT) 310, Bandpass Filter (BPF) 320, amplify via a Low-Noise Amplifier (LNA) 330, multiplex via a multiplexer 340, frequency convert using a frequency converter 350, linearize using a linearizer 360, amplify with an amplifier 370, multiplex to the proper EM polarization configuration using a multiplexer 380 and feed to the OMT 310 to the transmit antenna 390 feed for relay. The configuration of the transponders of the repeating relay may be comprised of a single transponder or a plurality of EM transponders with or without overlapping frequencies such as the horizontal and/or left-hand circular Type 1 transponders 800 and the vertical and/or right-hand circular Type 2 EM transponders 810 as shown in FIG. 8 which depicts a particular embodiment of a repeating relay with transponders with common and overlaid frequencies with a plurality of EM polarization configurations. In the particular embodiment shown in FIG. 8, no additional hardware (analog or digital) may be required to be added to the repeating relay.

In a second embodiment, the meta-carrier may be transmitted as a spread spectrum carrier that may be created at a transmission station 100 and transmitted to the remote relay 110 as shown in FIG. 4. The carrier may be extracted by the onboard beacon extraction device 400 and it may be routed to the beacon injection device 410 where the meta-carrier may be embedded into one or a plurality of transponders. In this embodiment, additional hardware (analog and/or digital) may be required to be added to the repeating relay 110.

In a third embodiment, the meta-carrier may be transmitted as a non-spread spectrum carrier that may be created at a transmission station 100 and transmitted to the remote relay as shown in FIG. 4 and extracted by the onboard beacon extraction device 400. The non-spread spectrum carrier may then be spread on board the repeater relay 110 and it may be routed to the beacon injection device 410 where the meta-carrier may be embedded into one or a plurality of transponders. In this embodiment, additional hardware (analog and/or digital) may be required to be added to the repeating relay 110.

In a fourth embodiment, the meta-data may be transmitted as a spread spectrum or non-spread spectrum carrier that may be created at a transmission station 100 and transmitted, periodically or one time, to the remote relay as shown in FIG. 5. The meta-data may be extracted by the onboard beacon extraction device 400 and sent to the beacon processor 500. The beacon processor 500 may store the meta-data and perform processing on the meta-data. The meta-data may be altered by the beacon processor 500 in a fashion that makes the information unique to each transponder or it may be the same information sent to each transponder. The meta-data may then be spread and modulated on the repeater relay 110 and sent to the beacon injection unit 410 for delivery to the output multiplexer 380. In this embodiment, additional hardware (analog and/or digital) may be required to be added to the repeating relay 110.

In a fifth embodiment, the meta-data may be retained in the beacon processor 500 and loaded one time at the creation of the repeater relay 110 as shown in FIG. 5. The meta-data may be sent by the beacon processor 500 in a fashion that makes the information unique to each transponder or it may be the same information sent to each transponder. The meta-data may then be spread and modulated on the repeater relay 110 and sent to the beacon injection unit 410 for delivery to the output multiplexer 380. In this embodiment, additional hardware (analog and/or digital) may be required to be added to the repeating relay 110.

One of ordinary skill in the art will recognize that the methods disclosed herein may rely on the use of spread spectrum technology but are not limited as such and may therefore utilize any methods of electromagnetic or optical transmission techniques using any known transmission method to transmit meta-data to a repeating relay.

Figure 6:
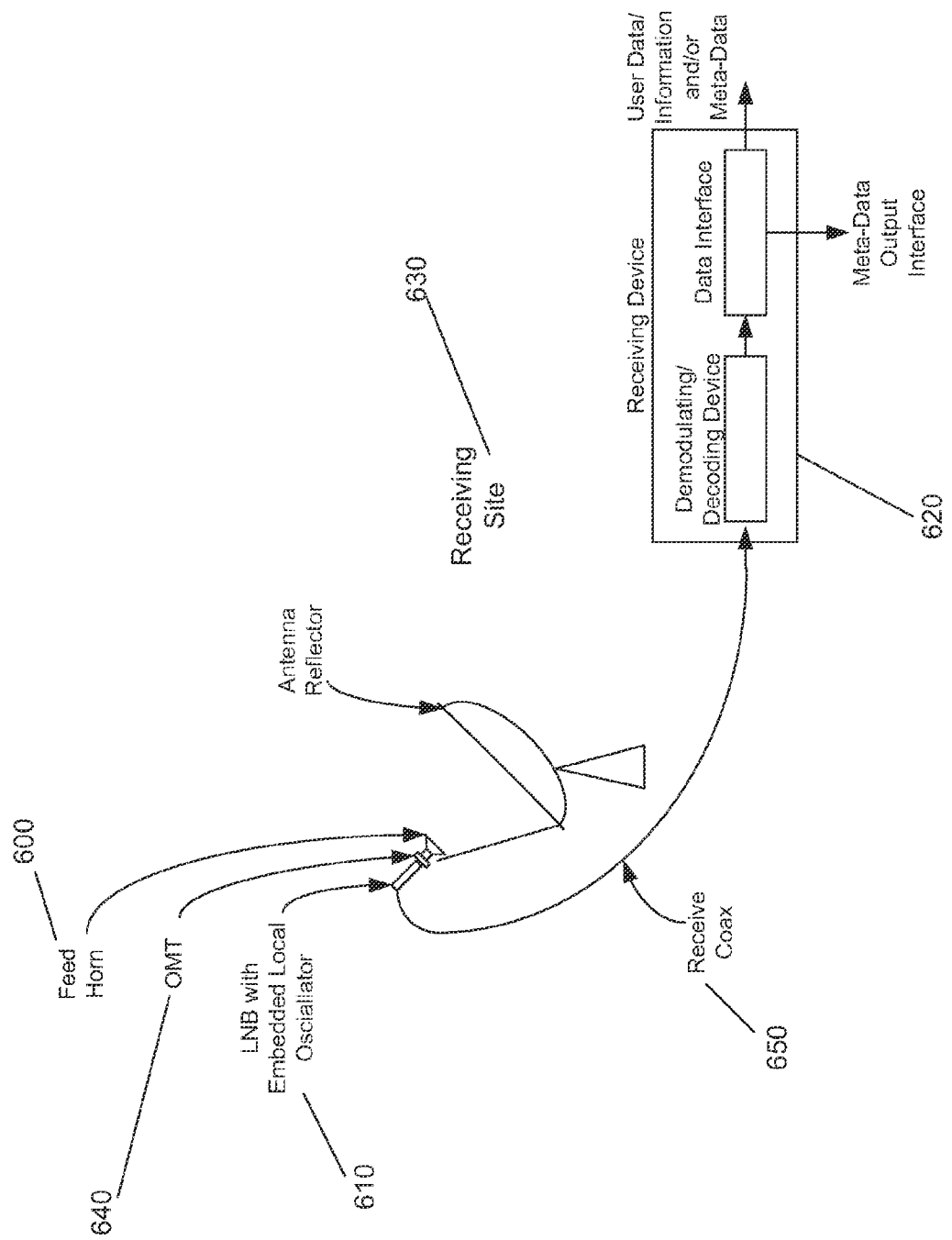
FIG. 6 is a block diagram of an implementation of a remote receiving site with a low-energy density meta-carrier receiver.

FIG. 6 shows a diagram of a receiving site that utilizes the described method for receiving both user data and the meta-carrier containing the meta-data information about the repeating relay 110. The receiving station 630 may comprise an antenna reflector that may be pointed to the repeating relay 110 as depicted in FIG. 6. The antenna reflector may be focused to a feed horn 600 where the received carrier from the repeater relay 110 may be focused and the OMT 640 separates the carrier into the proper polarizations. A Low Noise Block (LNB) amplifier 610 may be comprised of an LNA and down-converter for converting the radio frequency (RF) signal to an Intermediate Frequency (IF). In the art, the LNB amplifier 610 converts the RF (L-Band, S-Band, C-Band, X-Band, Ku-Band, Ka-Band, etc.) to IF at 70/140 MHz (50 MHz to 180 MHz) or L-Band (950 MHz to 2,150 MHz). The output of the LNB amplifier 610 may then be sent to a coaxial connection 650 to the receiving device where the signal comprised of the low-energy meta-carrier and user data carriers.

Figure 7:
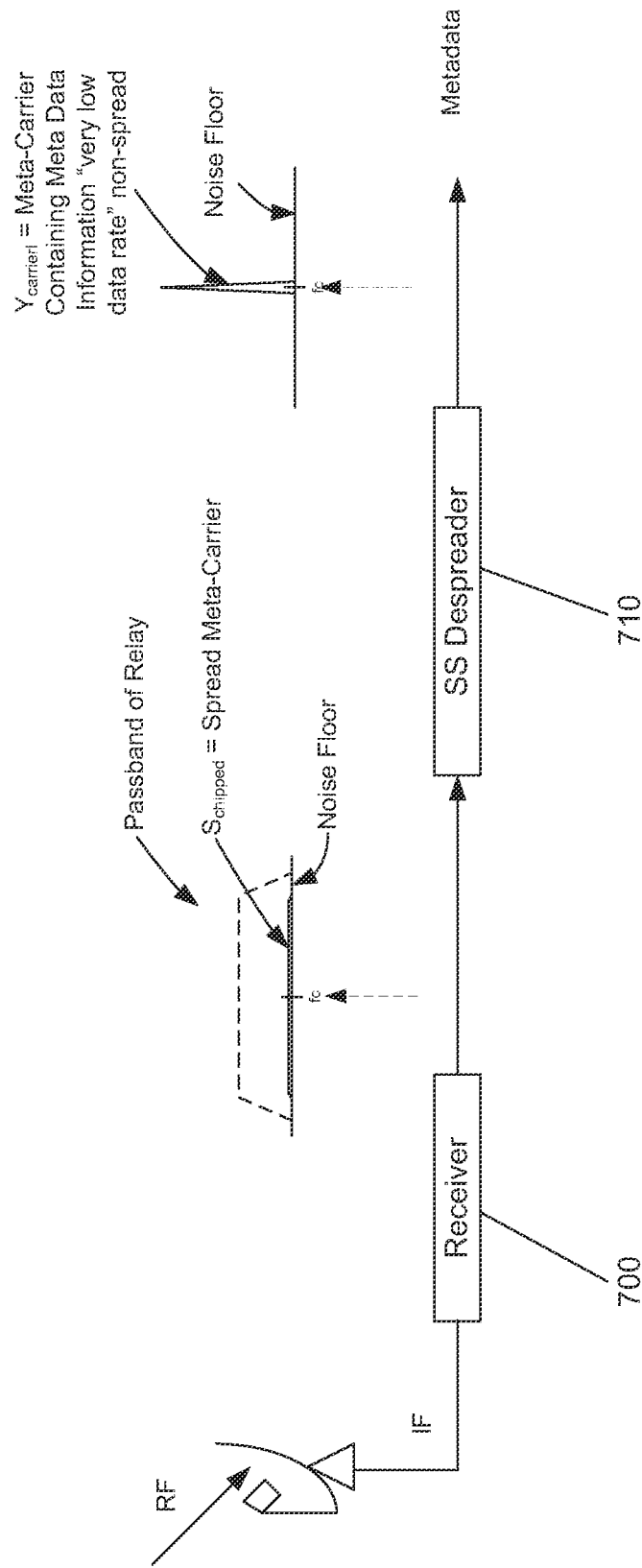
FIG. 7 is a block diagram of an implementation of a low-energy density meta-carrier receiver.

FIG. 7 shows a block diagram of the receiving device using the disclosed methods where the low-energy density meta-carrier is received and extracted from the passband of the received transponder, de-spread, demodulate and decode and provided to the user as meta-data. The receiver section 700 may perform the appropriate receiver functions such as level setting via an Automatic Gain Control (AGC) and then Spread Spectrum de-spreading may be performed by a spread-spectrum despreader 710. The despread meta-carrier may contain the meta-data for use by a receiving device to confirm, but is not limited to, information about a repeating relay's source to include information, but not limited to, ephemeris data, the name of the repeating relay, name of the owner, orbital location, center frequency, passband, and transponder electromagnetic (EM) polarization, etc.

The following provides non-limiting examples of particular implementations and embodiments of transmission of identification via meta-data for repeating relays using spread-spectrum technology techniques:

Example 1

A space-based satellite relay may be configured to receive earth-based carriers and relay the carriers back to the earth. The carrier(s) may be received, combined, amplified and combined with a low data rate meta-data carrier. A satellite earth station transmits the meta-data via a spread spectrum carrier to a satellite with repeating relays (transponders). One carrier is transmitted towards the satellite. The meta-data in this carrier can contain (but is not limited to) the following information; a) satellite operator, b) satellite name, c) orbital location, d) transponder numbers and associated center frequency assignments and electromagnetic polarizations.

Example 2

A space-based satellite relay may be configured to receive earth-based carriers and relay the carriers back to the earth. The carrier(s) may be received, combined, amplified and combined with a low data rate meta-data carrier. A satellite earth station transmits the meta-data via a spread spectrum carrier to a satellite with repeating relays (transponders). One carrier may be transmitted towards the satellite for each electromagnetic polarization (one horizontal and one vertical or one clockwise and one counterclockwise). The meta-data in this carrier can contain (but is not limited to) the following information: a) satellite operator, b) satellite name, c) orbital location, d) transponder numbers and associated center frequency assignments and electromagnetic polarizations.

Example 3

A space-based satellite relay may be configured to receive earth-based carriers and relay the carriers back to the earth. The carrier(s) may be received, combined, amplified and combined with a low data rate meta-data carrier. A satellite earth station transmits the meta-data via a spread spectrum carrier to a satellite with repeating relays (transponders). One carrier may be transmitted towards the satellite for each transponder of one electromagnetic polarization (one horizontal or one vertical or one clockwise or one counterclockwise). The meta-data in this carrier can contain (but is not limited to) the following information; a) satellite operator, b) satellite name, c) orbital location, d) transponder numbers and associated center frequency assignments and electromagnetic polarizations.

Example 4

A space-based satellite relay may be configured to receive earth-based carriers and relay the carriers back to the earth. The carrier(s) may be received, combined, amplified and combined with a low data rate meta-data carrier. A satellite earth station transmits the meta-data via a spread spectrum carrier to a satellite with repeating relays (transponders). One carrier may be transmitted towards the satellite for each transponder of each electromagnetic polarization (one horizontal or one vertical or one clockwise or one counterclockwise). Non-limiting examples of meta-data in this carrier include a) satellite operator, b) satellite name, c) orbital location, d) transponder numbers and associated center frequency assignments and electromagnetic polarizations.

Example 5

A satellite earth station may be configured to operate at an assigned center frequency, symbol rate and polarization to a satellite at a geo-equatorial location, polarization and frequency. For this example, the earth station may not be pointed to the proper satellite and begins transmission. This results in the wrong satellite being illuminated. In the event the improperly radiated satellite has the frequency assigned for use not for this carrier, the result may be an outage due to energy being injected into the satellite's transponder that may then be re-transmitted along with the proper carrier to receiving devices. The method may allow one to detect, resolve and process the meta-data of the wrong satellite, thus providing information to the interfering earth station, alerting the operator of the earth station as to its improperly configured carrier.

Example 6

In particular implementations of the system described in Examples 1-4, a carrier may be uplinked to as part of an ad-hoc service and the service may only be required for a short duration. As an aid to the link provider, the reception of the meta-data carrier may be used as confirmation that the transmitter may be set up on the proper transponder.

Example 7

In particular implementations of the system described in Examples 1-4, a satellite earth station may be configured to operate a carrier at an assigned center frequency, symbol rate and polarization to a satellite at a particular frequency and geo-equatorial location. For this example if the earth station is pointed to the proper satellite but has an incorrect carrier center frequency, and begins transmission, this results in the wrong frequency of a satellite transponder being illuminated. In this event, the improperly radiated satellite transponder may have the frequency assigned for use, but not for this carrier. The result may be an outage due to energy being injected into the satellite's transponder that may then be re-transmitted along with the proper carrier. The method may allow one to detect, resolve and process the satellite's meta-data carrier, thus providing information to the operator of the earth station about their improperly configured carrier.

Example 8

In particular implementations of the system described in Examples 1-4, a satellite earth station may be configured to operate a carrier at an assigned center frequency, symbol rate and polarization to a satellite at a particular frequency and geo-equatorial location. For this example, if the earth station is pointed to the proper satellite but has an incorrect carrier center frequency, and begins transmission, this results in the wrong frequency of a satellite transponder being illuminated. In this event, the improperly radiated satellite transponder does not have the frequency assigned for use. The result may be a spurious carrier whose source may be difficult to identify. The method may allow one to detect, resolve and process the satellite's meta-data carrier, thus providing information to the operator of the earth station about their improperly configured carrier.

Example 9

In particular implementations of the system described in Examples 1-4, a satellite earth station may be configured to operate a carrier at an assigned center frequency, symbol rate and polarization to a satellite at a particular frequency and geo-equatorial location. For this example, if the earth station is pointed to the proper satellite and has a correct carrier center frequency but the wrong symbol rate in excess of the assigned symbol rate and begins transmission, this results in the satellite transponder being illuminated with a carrier that crosses over into an adjacent channel. In this event, the improperly radiated satellite transponder has multiple carriers using the same frequency. The result may be an outage potentially of both adjacent carriers due to energy being injected into the satellite's transponder that may then be re-transmitted along with the adjacent carrier. The method may allow one to detect, resolve and process the satellite's meta-data carrier, thus providing information to the operator of the earth station about their improperly configured carrier.

Example 10

In particular implementations of the system described in Examples 1-4, a satellite earth station may be configured to operate a carrier at an assigned center frequency, symbol rate and polarization to a satellite at a particular frequency and geo-equatorial location. For this example if the earth station is pointed to the proper satellite, has a correct carrier center frequency, but an incorrect polarization and begins transmission, this results in the wrong frequency of a satellite transponder being illuminated. In this event, the improperly radiated satellite transponder has the frequency assigned for use, but not for this carrier. The result may be an outage due to energy being injected into the satellite's transponder that may then be re-transmitted along with the proper carrier. The method may allow one to detect, resolve and process the satellite's meta-data carrier, thus providing information to the operator of the earth station about their improperly configured carrier.

Example 11

In particular implementations of the system described in Examples 1-4, a satellite earth station may be configured to operate a carrier at an assigned center frequency, symbol rate and polarization to a satellite at a particular frequency and geo-equatorial location. For this example, if the earth station is pointed to the proper satellite, has a correct carrier center frequency, but an incorrect polarization and begins transmission, this results in the wrong frequency of a satellite transponder being illuminated. In this event, the improperly radiated satellite transponder does not have the frequency assigned for use. The result may be a spurious carrier whose source is difficult to identify. The method may allow one to detect, resolve and process the satellite's meta-data carrier, thus providing information to the operator of the earth station about their improperly configured carrier.

Example 12

An airborne relay is configured to receive earth-based carriers and relay the carriers back to the earth. The carrier(s) may be received, combined, amplified and combined with a low-data rate carrier containing meta-data, including but not limited to, information regarding the airborne relay's assigned location, owner, transponder identification, operating frequency, etc. For an airborne system, the bandwidth may be spread over one or many transponders.

Example 13

A terrestrial relay may be configured to receive terrestrial or airborne carriers and relay the carriers to the same or different geographic location(s). The carrier(s) may be received, combined, amplified and combined with a low-data rate meta-data carrier containing, but not limited to, information regarding the relay's assigned location, owner, operating frequency, etc. For a terrestrial relay system, the bandwidth may be spread over one or multiple frequency allocations.

In places where the description above refers to particular implementations of telecommunication systems and techniques for transmitting data across a telecommunication channel, it should be readily apparent that a number of modifications may be made without departing from the spirit thereof and that these implementations may be applied to other to telecommunication systems and techniques for transmitting data across a telecommunication channel.

The invention claimed is:

1. A communication method for transmitting meta-data through a meta-carrier signal, the method comprising:
   encoding meta-data using an encoder, the meta-data comprising information that identifies or describes a repeating relay or one or more transponders of the repeating relay to which a spread meta-carrier signal is to be transmitted;
   modulating, using a modulator, the encoded meta-data signal;
   spreading, using a spreader, the modulated meta-carrier such that the spread meta-carrier signal results;
   transmitting, by a transmitting device, the spread meta-carrier signal to the repeating relay wherein the repeating relay does not process or modify the spread meta-carrier signal, the spread meta-carrier signal being transmitted over at least a portion of the bandwidth of the repeating relay without reserving the entire bandwidth for transmitting the spread meta-carrier signal;
   extracting, by a beacon extraction device within the repeating relay, the spread meta-carrier signal;
   routing, by the beacon extraction device, the spread meta-carrier signal to a beacon injection device; and
   embedding, by the beacon injection device, the spread meta-carrier signal to one or more transponders.

2. The method of claim 1, further comprising:
   receiving the spread meta-carrier signal by a receiving device;
   despreading, using a despreader, the spread meta-carrier signal;
   demodulating, using a demodulator, the de-spread meta-carrier signal; and
   decoding, using a decoder, the demodulated meta-carrier signal.

3. The method of claim 1, wherein the spread meta-carrier signal is transmitted over substantially the entire bandwidth of the repeating relay.

4. The method of claim 1, wherein the repeating relay is located on a satellite.

5. The method of claim 1, wherein the modulating uses a phase shift keying (PSK) technique.

6. The method of claim 1, wherein the spreading uses a predetermined pseudo-random-noise (PRN) sequence.

7. The method of claim 1, wherein the meta-data further comprises ephemeris data for the repeating relay.

8. The method of claim 1, wherein the spread meta-carrier signal is transmitted at a power level that is at or below a noise floor of the repeating relay.

9. A communication method for transmitting meta-data through a meta-carrier signal, the method comprising:
encoding meta-data using an encoder, the meta-data comprising information that identifies or describes a repeating relay or one or more transponders of the repeating relay to which a spread meta-carrier signal is to be transmitted;
modulating, using a modulator, the encoded meta-data signal;
spreading, using a spreader, the modulated meta-carrier such that the spread meta-carrier signal results;
transmitting, by a transmitting device, the spread meta-carrier signal to the repeating relay wherein the repeating relay reroutes the spread meta-carrier signal to one or more transponders, the spread meta-carrier signal being transmitted over at least a portion of a bandwidth of the repeating relay without reserving the entire bandwidth for transmitting the spread meta-carrier signal;
extracting, by a beacon extraction device within the repeating relay, the spread meta-carrier signal;
routing, by the beacon extraction device, the spread meta-carrier signal to a beacon injection device; and
embedding, by the beacon injection device, the spread meta-carrier signal to one or more transponders.

10. The method of claim 9, further comprising:
receiving the spread meta-carrier signal by a receiving device;
despreading, using a despreader, the spread meta-carrier signal;
demodulating, using a demodulator, the de-spread meta-carrier signal; and
decoding, using a decoder, the demodulated meta-carrier signal.

11. The method of claim 9, wherein the spread meta-carrier signal is transmitted over substantially the entire bandwidth of the repeating relay.

12. The method of claim 9, wherein the repeating relay is located on a satellite.

13. The method of claim 9, further comprising:
routing, by the beacon extraction device, the meta-carrier signal to a beacon processor; and
processing, by the beacon processor, the meta-carrier signal to form a processed meta-carrier signal.

14. The method of claim 13, further comprising storing, by a storage device, meta-data received by the repeating relay.

15. The method of claim 13, wherein the processing creates a unique meta-carrier signal for each transponder.

16. The method of claim 13, wherein the processing creates a substantially identical meta-carrier signal for each transponder.

17. The method of claim 13, further comprising:
retaining, by the beacon processor, the processed meta-carrier signal; and
loading, by the beacon processor, the processed meta-carrier signal when the repeating relay is created.

18. The method of claim 9, wherein the modulating uses a phase shift keying (PSK) technique.

19. The method of claim 9, wherein the spreading uses a predetermined pseudo-random-noise (PRN) sequence.

20. The method of claim 9, wherein the meta-data further comprises ephemeris data for the repeating relay.

21. The method of claim 9, wherein the spread meta-carrier signal is transmitted at a power level that is at or below a noise floor of the repeating relay.

22. A communication method for transmitting meta-data through a meta-carrier signal, the method comprising:
spreading, by a spreading device, a meta-carrier signal containing data stored by a repeating relay and meta-data comprising information that identifies or describes the repeating relay or one or more transponders of the repeating relay; and
transmitting the spread meta-carrier signal to a remote receiver, the spread meta-carrier signal being transmitted over at least a portion of a bandwidth of the repeating relay without reserving the entire bandwidth for transmitting the spread meta-carrier signal;
extracting, by a beacon extraction device within the repeating relay, the spread meta-carrier signal;
routing, by the beacon extraction device, the spread meta-carrier signal to a beacon injection device; and
embedding, by the beacon injection device, the spread meta-carrier signal to one or more transponders.

23. The method of claim 22, wherein the spread meta-carrier signal is transmitted over substantially the entire bandwidth of the repeating relay.

24. The method of claim 22, wherein the repeating relay is located on a satellite.

25. The method of claim 22, wherein the spreading uses a predetermined pseudo-random-noise (PRN) sequence.

26. The method of claim 22, wherein the meta-data further comprises ephemeris data for the repeating relay.

27. The method of claim 22, wherein the spread meta-carrier signal is transmitted at a power level that is at or below a noise floor of the repeating relay.

28. A communication system for transmitting meta-data through a meta-carrier signal, the system comprising:
an encoder that encodes meta-data, the meta-data comprising information that identifies or describes a repeating relay or one or more transponders of the repeating relay to which a spread meta-carrier signal is to be transmitted;
a modulator that modulates the encoded meta-data signal;
a spreader that spreads the modulated meta-carrier such that the spread meta-carrier signal results;
a transmitting device that transmits the spread meta-carrier signal to the repeating relay wherein the repeating relay does not process or modify the spread meta-carrier signal, the spread meta-carrier signal being transmitted over at least a portion of a bandwidth of the repeating relay without reserving the entire bandwidth for transmitting the spread meta-carrier signal; and
a beacon extraction device within the repeating relay that extracts the spread meta-carrier signal and routes the spread meta-carrier signal to a beacon injection device that embeds the spread meta-carrier signal to one or more transponders.

29. The system of claim 28, further comprising:
a receiving device that receives the spread meta-carrier signal;
a despreader that despreads the spread meta-carrier signal;
a demodulator that demodulates the de-spread meta-carrier signal; and
a decoder that decodes, the demodulated meta-carrier signal.

30. The system of claim 28, wherein the spread meta-carrier signal is transmitted over substantially the entire bandwidth of the repeating relay.

31. The system of claim 28, wherein the repeating relay is located on a satellite.

32. The system of claim 28, wherein the modulator uses a phase shift keying (PSK) technique.

33. The system of claim 28, wherein the spreader uses a predetermined pseudo-random-noise (PRN) sequence.

34. The system of claim 28, wherein the meta-data further comprises ephemeris data for the repeating relay.

35. The system of claim 28, wherein the meta-data further comprises information that identifies a modulator that modulates the spread meta-carrier signal; and the spread meta-carrier signal is transmitted at a power level that is at or below a noise floor of the repeating relay.

36. A communication system for transmitting meta-data through a meta-carrier signal, the system comprising:

an encoder that encodes meta-data, the meta-data comprising information that identifies or describes a repeating relay or one or more transponders of the repeating relay to which a spread meta-carrier signal is to be transmitted;

a modulator that modulates the encoded meta-data signal using a modulator;

a spreader that spreads the modulated meta-carrier such that the spread meta-carrier signal results; and a transmitting device that transmits, the spread meta-carrier signal to the repeating relay wherein the repeating relay reroutes the spread meta-carrier signal to one or more transponders, the spread meta-carrier signal being transmitted over at least a portion of a bandwidth of the repeating relay without reserving the entire bandwidth for transmitting the spread meta-carrier signal; and a beacon extraction device within the repeating relay that extracts the spread meta-carrier signal and routes the spread meta-carrier signal to a beacon injection device that embeds the spread meta-carrier signal to one or more transponders.

37. The system of claim 36, further comprising:
a receiving device that receives the spread meta-carrier signal;
a despreader that despreads the spread meta-carrier signal;
a demodulator that demodulates the de-spread meta-carrier signal; and
a decoder that decodes the demodulated meta-carrier signal.

38. The system of claim 36, wherein the spread meta-carrier signal is transmitted over substantially the entire bandwidth of the repeating relay.

39. The system of claim 36, wherein the repeating relay is located on a satellite.

40. The system of claim 36, further comprising:
a beacon processor that receives the meta-carrier signal from the beacon extraction device and processes the meta-carrier signal to form a processed meta-carrier signal.

41. The system of claim 40, further comprising a storage device that stores meta-data received by the repeating relay.

42. The system of claim 40, wherein the processor creates a unique meta-carrier signal for each transponder.

43. The system of claim 40, wherein the processor creates a substantially identical meta-carrier signal for each transponder.

44. The system of claim 40, wherein the beacon processor retains the processed meta-carrier signal and loads the processed meta-carrier signal when the repeating relay is created.

45. The system of claim 36, wherein the modulator uses a phase shift keying (PSK) technique.

46. The system of claim 36, wherein the spreader uses a predetermined pseudo-random-noise (PRN) sequence.

47. The system of claim 36, wherein the meta-data further comprises ephemeris data for the repeating relay.

48. The system of claim 36, wherein the spread meta-carrier signal is transmitted at a power level that is at or below a noise floor of the repeating relay.

49. A communication system for transmitting meta-data through a meta-carrier signal, the system comprising:

a spreader that spreads a meta-carrier signal containing data stored by a repeating relay and meta-data comprising information that identifies or describes the repeating relay or one or more transponders of the repeating relay;

a transmitting device that transmits the spread meta-carrier signal to a remote receiver, the spread meta-carrier signal being transmitted over at least a portion of a bandwidth of the repeating relay without reserving the entire bandwidth for transmitting the spread meta-carrier signal; and a beacon extraction device within the repeating relay that extracts the spread meta-carrier signal and routes the spread meta-carrier signal to a beacon injection device that embeds the spread meta-carrier signal to one or more transponders.

50. The system of claim 49, wherein the spread meta-carrier signal is transmitted over substantially the entire bandwidth of the repeating relay.

51. The system of claim 49, wherein the repeating relay is located on a satellite.

52. The system of claim 49, wherein the spreader uses a predetermined pseudo-random-noise (PRN) sequence.

53. The system of claim 49, wherein the meta-data further comprises ephemeris data for the repeating relay.

54. The system of claim 49, wherein the meta-data is stored in a memory device that is programmed before the repeating relay is placed into service.

55. The system of claim 49, where in the meta-data is transmitted to the repeating relay using a method of electromagnetic or optical transmission.

56. The system of claim 49, wherein the spread meta-carrier signal is transmitted at a power level that is at or below a noise floor of the repeating relay.

* * * * *